United States Patent [19]

Gerstmeier

[11] 3,757,267
[45] Sept. 4, 1973

[54] VARIABLE RESISTANCE DEVICE WITH MULTIFUNCTION WIPER CARRIER

[75] Inventor: George A. Gerstmeier, Tustin, Calif.

[73] Assignee: Beckman Instruments, Inc., Fullerton, Calif.

[22] Filed: July 28, 1972

[21] Appl. No.: 276,046

[52] U.S. Cl............................ 338/174, 338/DIG. 1
[51] Int. Cl............................................. H01c 9/02
[58] Field of Search...................... 338/DIG. 1, 174, 338/162, 169, 170, 171

[56] References Cited
UNITED STATES PATENTS
3,522,573   8/1970   Michik........................... 338/DIG. 1
3,696,318   10/1972  Mack.............................. 338/174 X Primary Examiner—Bernard A. Gilheany
Assistant Examiner—D. A. Tone
Attorney—Fred L. Mehlhoff, Robert J. Steinmayer et al.

[57] ABSTRACT

In a variable resistance device of the type including a housing enclosing a cavity in which an annular resistance element is supported on a nonconductive base member, a bearing post projecting into the cavity and defining an axis of rotation, a rotor member positioned within the housing and having top, bottom, and side surfaces and an axial bore for receipt of the bearing post, an electrically conductive wiper secured to the rotor member for rotation therewith and extending into electrically conductive engagement with the resistance element, and a worm screw journalled through a side wall of the housing for rotating the rotor member, the improvement wherein the rotor member is formed from a resilient material and has a slot extending laterally therethrough and inwardly from the bottom surface thereof, wherein the wiper member is substantially flat and extends through the slot in the rotor member, wherein the base member contacts the bottom surface of the rotor member, and wherein the bearing post has a beveled surface at the base thereof which contacts the wall of the rotor member bore, adjacent the top surface thereof, and thereby exerts an axial force on the rotor member to assure engagement between the bottom surface thereof and the base member, the axial force causing compression and deformation of the rotor member thereby closing the slot around the wiper member to firmly retain the wiper member therein. The rotor member has a plurality of gear teeth formed in the periphery thereof which engage the worm screw, the axial force on the rotor member assuring engagement between the gear teeth and the worm screw. The top surface of the rotor member has an arcuate groove formed therein, the groove partially absorbing the deformation of the rotor member and providing a degree of flexibility for the gear teeth.

9 Claims, 9 Drawing Figures

VARIABLE RESISTANCE DEVICE WITH MULTIFUNCTION WIPER CARRIER

BACKGROUND OF THE INVENTION

1. Field of the Invention

The present invention relates to a variable resistance device with a multifunction wiper carrier and, more particularly, to a variable resistance device in which the design and material of the rotor member permits elimination of separate wiper retaining means, separate pressure means, and separate clutch means.

2. Description of the Prior Art

The present invention relates to variable resistance devices used for the adjustment of electrical circuits, commonly known as trimmer potentiometers. Such potentiometers generally include a housing enclosing a cavity in which an annular resistance element is supported on a nonconductive base member, a wiper carrier or rotor member mounted within the housing, an electrically conductive wiper secured to the rotor member for rotaton therewith and extending into electrically conductive engagement with the resistance element, and drive means for rotating the rotor member. Such potentiometers often have a stop means which engages the movable rotor member and prevents it from advancing beyond a designated position. When such a stop means is used, continued rotation of the driving mechanism may damage either the rotor member or the driving mechanism and result in permanent damage or impairment of the variable resistance device. Accordingly, such variable resistance devices often incorporate a slip clutch arrangement which permits the driving mechanism to slip with respect to the rotor member when the rotor member is prevented from rotation by an appropriate stop means.

In such potentiometers, it is necessary to provide some means for attaching the wiper to the rotor member. In addition to such fastening means, it is necessary to provide a force to maintain the wiper in electrically conductive engagement with the annular resistance element.

Trimmer potentiometers of the type discussed above are frequently mounted for use on circuit boards. Since circuit designers strive for dense packaging of discrete devices on such boards, there is created a requirement for miniaturization of the devices. In striving for miniaturization, potentiometer designers find it advantageous to incorporate more than one function into a part of a device. In other words, it is desirable to be able to perform the above-mentioned functions with a minimum number of discrete elements. For example, in existing trimming potentiometers, both rotary and rectilinear, it is common practice to attach the wiper to the rotor member by mechanical means or by placing the wiper in a slot provided in the rotor member and retaining the wiper by heat or ultrasonic deformation of the slot. This elmininates the necessity for a separate fastening means. However, the deformation method is only adaptable to rotor members fabricated of thermoplastic materials.

When a trimmer potentiometer is required to operate at elevated temperatures, typically in the range of from 150°C to 175°C, thermoplastic materials are not acceptable. Commonly employed for housing applications in such cases are thermosetting plastics such as diallyl phthalates or phenolics. For the rotor members, rigid plastics may be employed but require an intermediate component to permit the rotor member to idle at the end of an excursion while the actuating drive screw continues to turn. It is, therefore, common practice to utilize a material for the rotor member which is resistant to relatively high temperature but which exhibits the mechanical properties of a thermoplastic material, such as the fluorocarbon materials, representative of which are polytetrafluoroethylene and monochlorotrifluoroethylene.

In utilizing a rotor member formed from a fluorocarbon material, the choice of attachment of the wiper to the carrier has heretofore been limited to mechanical means such as stapling or the like since the material does not readily displace by heat or ultrasonic deformation. Nor is insert molding of the wiper into the carrier a practical method due to the inability to mold fluorocarbon materials by conventional means.

SUMMARY OF THE INVENTION

In accordance with the present invention, there is provided a variable resistance device which permits miniaturization by providing a multifunction wiper carrier. The design of the present potentiometer in combination with the material from which the rotor member is formed permits complete elimination of a separate wiper retaining means and separate means to maintain the wiper in electrically conductive engagement with the annular resistance element. Furthermore, the material of which the rotor member is formed is sufficiently flexible to permit elimination of a separate clutch means.

Briefly, the present improvement consists of forming the rotor from a resilient fluorocarbon material and providing the rotor with a slot extending laterally therethrough and inwardly from the bottom surface thereof. The wiper member is substantially flat and extends through the slot in the rotor member. A bearing post projects into an axial bore in the rotor, the bearing post having a beveled surface at the base thereof which contacts the wall of the rotor bore, adjacent the top surface thereof. The base member which supports the annular resistance element is insertable into the housing until it contacts the bottom surface of the rotor. An axial force is applied to the top surface of the rotor by the beveled surface of the bearing post. This force assures engagement between the bottom surface of the rotor member and the base member. Furthermore, because of the resilient material from which the rotor member is formed, the axial force causes compression and deformation of the rotor member thereby closing the slot around the wiper member to firmly retain the wiper member therein.

A plurality of gear teeth are formed in the periphery of the rotor member, at the intersection between the side surface and the top surface thereof. The gear teeth are engaged by the actuating worm screw mounted in the housing. The axial force applied to the rotor member by the base member assures engagement between the gear teeth and the worm screw. In addition, the top surface of the rotor member has an arcuate groove formed therein. In the first instance, the groove partially absorbs the deformation of the rotor member. However, the groove also provides a degree of flexibility for the gear teeth. In this manner, when the stop extension on the rotor member engages the stop means in the housing, continued rotation of the driving mechanism causes a stripping action to occur between the threads of the worm screw and the gear teeth on the rotor member, due to the resilient nature of the fluorocarbon material and the flexibility of the gear teeth.

It is therefore an object of the present invention to provide a variable resistance device with a multifunction wiper carrier.

It is a further object of the present invention to provide a variable resistance device in which the design of the rotor member and the material from which it is formed permits elimination of separate wiper retainer means, separate pressure means, and separate clutch means.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
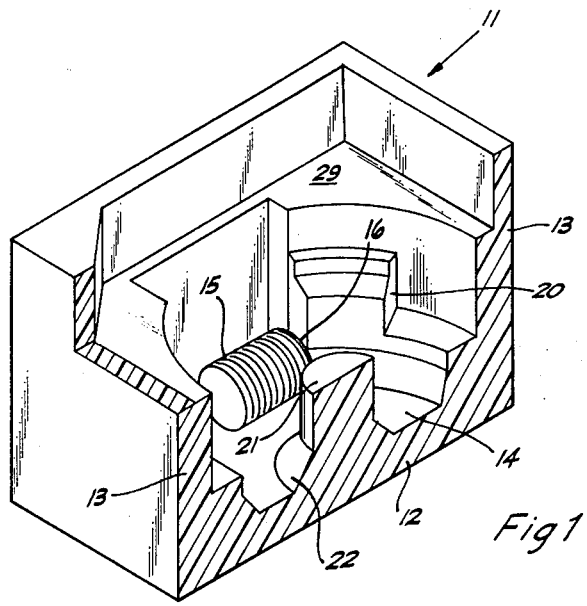
FIG. 1 is a perspective view of the housing of the present variable resistance device, taken along a plane through the center thereof.
Figure 9:
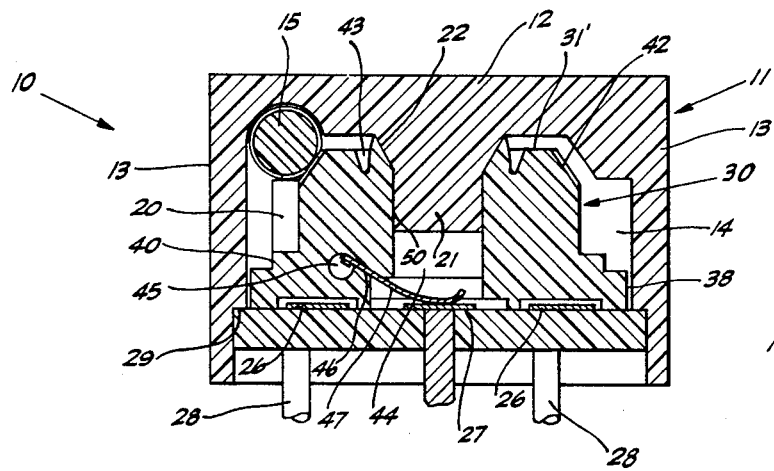
FIG. 9 is a sectional view taken along the line 9—9 in FIG. 8.
Figure 8:
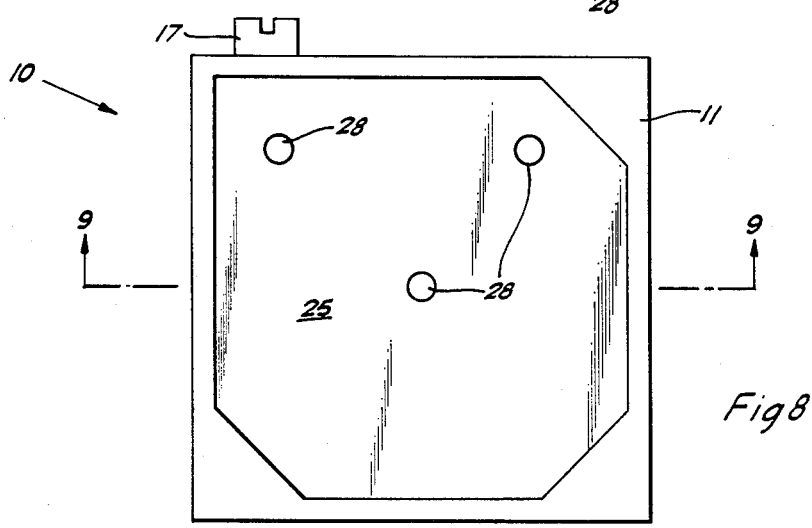
FIG. 8 is a bottom plan view of a completed variable resistance device incorporating the components of FIGS. 1–7.

Referring now to the drawings and, more particularly, to FIGS. 1, 8, and 9 thereof, there is shown a housing, generally designated 11, for use in a variable resistance device, generally designated 10, of the type generally referred to as a rotary "trimming" potentiometer. Variable resistance devices of this type are fully disclosed in U. S. Pat. Nos. 3,378,803 and 3,617,978 issued to Charles W. Youngblut et al. and George A. Gerstmeier, respectively, and assigned to Beckman Instruments, Inc., the assignee of the present invention.

In the illustrated embodiment, housing 11 has a generally rectangular shape within which the operating components are enclosed. Housing 11 has at least one end wall 12 and side walls 13 defining a centrally located cavity 14. It is not essential that housing 11 be rectangular in shape and it may take on a circular or other type configuration. Housing 11 may be of any suitable material but is preferably formed of a thermosetting plastic material.

Trimming potentiometer 10 includes drive means mounted within housing 11 for rotating a wiper carrier, to be described hereinafter, positioned therein. Such drive means comprises a worm screw 15 journalled in a well-known manner in an opening 16 in one of side walls 13 of housing 11. Preferably, worm screw 15 is provided with a slotted head 17 which protrudes from housing 11 and which is adapted to be rotated by a screwdriver or other appropriate instrument.

Stop means are provided within housing 11 for cooperation with a stop means on the wiper carrier for preventing rotation beyond a designated position. According to the illustrated embodiment, the stop means in housing 11 comprises a shoulder abutment 20 extending radially inwardly from one of side walls 13, into cavity 14. Such a shoulder abutment is conventional in trimming potentiometers of this type.

Housing 11 also incorporates a bearing post 21 which may be made integral with end wall 12 and which projects into cavity 14 thereby defining an axis of rotation. Bearing post 21 has a beveled surface 22 at the base thereof, adjacent end wall 12. According to the embodiment of the invention shown in FIG. 1, beveled surface 22 forms an angle of approximately 30° with the axis of bearing post 21.

Within the open end of housing 11 is positionable a base member 25 formed of a nonconductive ceramic material such as a steatite or alumina. Supported on base member 25 is an annular resistance element 26 in the form of a thin arcuate strip or layer of deposited material. Resistance element 26 may be formed of a resistance material commonly referred to as a "cermet" resistance element, although other resistance materials such as conductive plastics and deposited metallic films may be employed. Such elements are fully disclosed in U. S. Pat. Nos. 2,950,995 and 2,950,996 issued to T. M. Place, Sr. et al., and assigned to Beckman Instruments, Inc., the assignee of the present invention.

Base member 25 also supports a central collector element 27 which may typically comprise a thin layer or sheet of deposited silver or platinum alloy or the like. Means, including terminal pins or members 28 extend through base member 25 and are provided to connect resistance element 26 and collector element 27 to the outside circuitry with which potentiometer 10 is to be used.

Base member 25 is positioned within cavity 14 in housing 11 and abuts against a continuous shoulder 29 made integral with side walls 13. Base member 25 may be retained in cavity 14, against shoulder 29, by means of a potting compound, not shown.

Referring now to FIGS. 2–5, there is shown a wiper carrier or rotor member, generally designated 30, adapted to be mounted within cavity 14 in housing 11 for rotational movement about an axis substantially conforming to the axis of annular resistance element 26, collector element 27, and bearing post 21. Rotor member 30 is preferably formed from a resilient fluorocarbon material such as polytetrafluoroethylene or monochlorotrifluoroethylene. Such a material is resistant to relatively high temperatures and exhibits the mechanical properties of a thermoplastic material.

Rotor member 30 has substantially planar top and bottom surfaces 31 and 32, respectively, and a generally cylindrical side surface 33. Bottom surface 32 has formed therein an annular recessed area 34 and a central recessed area 35. Intermediate areas 34 and 35 is a narrow pressure ring 36 which is coplanar with the outer edge 37 of bottom surface 32.

Side surface 33 of rotor member 30 includes an increased diameter portion 38 adjacent bottom surface 32 and a decreased diameter portion 39 which comprises a major portion of rotor member 30. A strengthening collar 40 may connect portions 38 and 39. A stop extension 41 protrudes radially outwardly from portion 39 of side surface 33 of rotor member 30, stop extension 41 engaging shoulder abutment 20 in cavity 14 to prevent advancement beyond a designated position.

Gear teeth 42 are formed in the periphery of rotor member 30. According to the preferred embodiment of the present invention, gear teeth 42 are positioned at the intersection between portion 39 of side surface 33 and top surface 31, preferably at an angle of approximately 35° with respect to the axis of rotor member 30. As will be described more fully hereinafter, gear teeth 42 are adapted to engage worm screw 15 and to be driven thereby.

Top surface 31 of rotor member 30 has a deep, arcuate, generally V-shaped groove 43 formed therein for reasons which will appear more fully hereinafter. Preferably, the portion 31' of top surface 31 which is radially outward from groove 43 is shorter than the remainder thereof. Rotor member 30 further includes an axial bore 44 which preferably extends entirely therethrough and which receives bearing post 21.

Referring now to FIGS. 4–7 and 9, rotor member 30 has a hole 45 extending laterally therethrough, adjacent but spaced from bottom surface 32. A slot 46 extends entirely through rotor member 30, from hole 45 to bottom surface 32. Slot 46 may be positioned, for example, at an angle of 45° relative to bottom surface 32. Hole 45 and slot 46 are provided and adapted to receive a substantially flat wiper member 47, which is preferably formed of multiple wires of a precious metal alloy. One end of wiper 47 includes a flange 48 adapted to extend through hole 45, the body of wiper 47 extending through slot 46 with the other end thereof extending beyond bottom surface 32 of rotor member 30. The other end of wiper 47 may be bent upwardly in the usual manner to prevent damage to annular resistance element 26.

Figure 4:
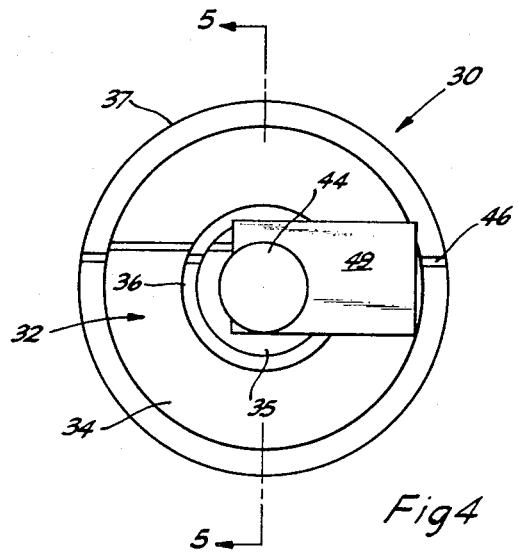
FIG. 4 is a bottom plan view of the rotor member of FIG. 2.
Figure 5:
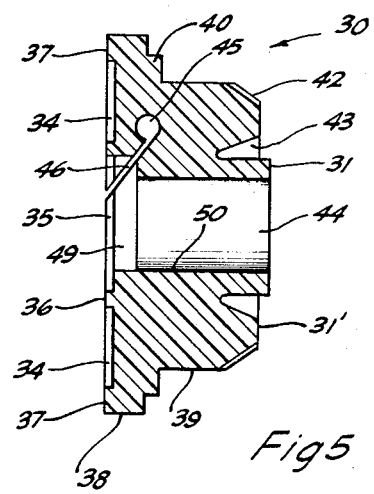
FIG. 5 is a sectional view taken along the line 5—5 in FIG. 4.
Figure 3:
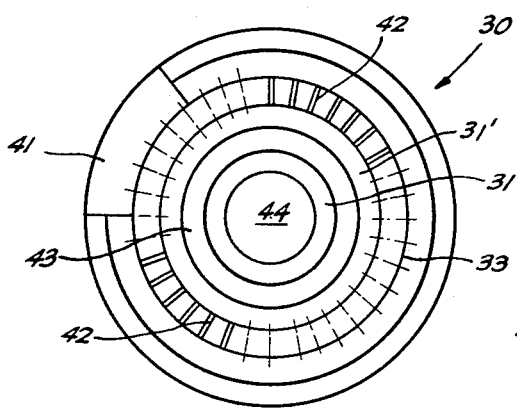
FIG. 3 is a top plan view of the rotor member of FIG. 2.
Figure 2:
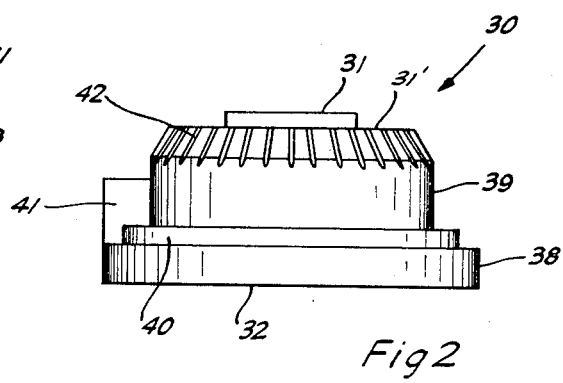
FIG. 2 is an elevation view of the rotor member of the present variable resistance device.
Figure 6:
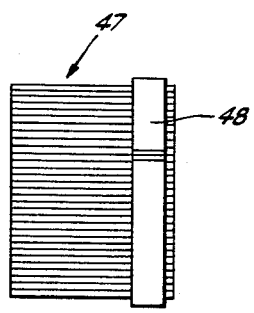
FIGS. 6 and 7 are enlarged, top plan and end views, respectively, of a wiper for use with the rotor member of FIGS. 2–5.
Figure 7:
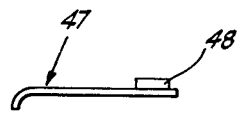

Referring now to FIGS. 4, 5, and 9, the width of wiper member 47 is approximately equal to one-half of the diameter of bottom surface 32 of rotor member 30. Wiper member 47 is adapted to be positioned in hole 45 and slot 46 so as to be spaced from outer edge 37 of bottom surface 32 and so as to extend beyond the axis of rotation of rotor member 30. In this manner, wiper member 47, when positioned in housing 11, is adapted to contact both annular resistance element 26 and collector element 27. When so contacting elements 26 and 27, the free end of wiper member 47 will flex around the pivot point provided by hole 45 and slot 46. Accordingly, bottom surface 32 of rotor member 30 has a rectangular recessed area 49 therein which defines a volume in which wiper member 47 may freely flex in response to the pressure applied thereto by base member 25.

In operation, potentiometer 10 is assembled by first positioning wiper member 47 in hole 45 and slot 46 in rotor member 30 so that it is aligned with recessed area 49 therein. Thereafter, rotor member 30 is inserted into cavity 14 in housing 11 with bearing post 21 extending into axial bore 44. Base member 25 is then positioned within housing cavity 14 until it abuts against shoulder 29. During insertion of base member 25, the upper surface thereof presses against outer edge 37 of rotor member 30 thereby providing an interface upon which rotor member 30 may ride during rotation thereof. Pressure ring 36 also contacts base member 25 providing another interface for supporting rotor member 30 during rotation thereof.

The positioning of base member 25 in housing cavity 14 causes an axial force to be exerted against rotor member 30 through outer edge 37 and pressure ring 36. Such force moves top surface 31 of rotor member 30 towards end wall 12 of housing 11 until the wall 50 of rotor member bore 44 contacts beveled surface 22. Continued application of such force causes wall 50 to be deformed at the interface with beveled surface 22 to substantially conform to the angle thereof. Such deformation is readily achievable with a rotor member formed from a resilient fluorocarbon material.

The deformation of wall 50 of rotor member bore 44 causes some lateral displacement of rotor member 30, adjacent top surface 31. More significantly, an axial force is applied to rotor member 30 via top surface 31, which axial force assures engagement between bottom surface 32 of rotor member 30 and base member 25. Furthermore, because of the resilient material from which rotor member 30 is formed, the axial force between beveled surface 22 and pressure ring 36 causes rotor member 30 to be compressed. Such compression of rotor member 30 closes slot 46 around wiper member 47 thereby firmly retaining wiper member 47 in rotor member 30 without the need for additional mechanical fastening means.

Because of the close tolerances involved and the size of potentiometer 10, it is not possible to accurately control the exact amount of deformation of rotor member 30. Accordingly, groove 43 in top surface 31 of rotor member 30 is provided to partially absorb the displacement of the material of rotor member 30. The amount of material absorbed by groove 43 will, of course, be determined by the actual dimensions of the finished part.

The axial force applied to top surface 31 of rotor member 30 by beveled surface 22 of bearing post 21 is resisted by the force applied to pressure ring 36 and outer edge 37 of rotor member 30 by base member 25. This latter force assures an interference engagement between gear teeth 42 and the threads of worm screw 15. Such interference engagement is extremely critical in a minature trimming potentiometer where the depth of gear teeth 42 may only be a few thousandths of an inch.

Because of the location of groove 43 in top surface 31 of rotor member 30, there is no rigid backing for gear teeth 42 in rotor member 30. Thus, groove 43 further operates to permit lateral displacement of outer portion 31' of top surface 31 and gear teeth 42. Such ability to move laterally provides teeth 42 with a degree of flexibility which, in the first instance, tends to force gear teeth 42 against the threads of worm screw 15. Such flexibility has still another advantage. More specifically, as worm screw 15 is actuated, rotor member 30 will rotate until the motion thereof is limited by the engagement of stop extension 41 on rotor member 30 and shoulder abutment 20 in housing 11. With continued actuation of worm screw 15, a stripping action occurs between the threads thereon and gear teeth 42 on rotor member 30. However, due to the resilient nature of the fluorocarbon material of rotor member 30 and the degree of flexibility provided by groove 43, such stripping action does not damage gear teeth 42.

It can therefore be seen that in accordance with the present invention, there is provided a variable resistance device 10 which permits miniaturization by providing a multifunction rotor member 30. The design of potentiometer 10 in combination with the material from which rotor member 30 is formed permits complete elimination of a separate wiper retaining means and a separate means to maintain wiper member 47 in electrically conductive engagement with annular resistance element 26 and collector element 27. Furthermore, the material of which rotor member 30 is formed is sufficiently flexible to permit elimination of a separate clutch means.

While the invention has been described with respect to a preferred physical embodiment constructed in accordance therewith, it will be apparent to those skilled in the art that various modificaitons and improvements may be made without departing from the scope and the spirit of the invention. For example, modifications may be made to the shape of rotor member 30 while still permitting the deformation thereof upon insertion into housing 11. For example, pressure ring 36 in bottom surface 32 of rotor member 30 may be eliminated, thereby providing a single, recessed area, and one or more protuberances may be provided extending through such single recessed area to a plane including outer edge 37 of bottom surface 32. Such protuberances would engage base member 25 and cooperate with beveled surface 22 to provide the force necessary to firmly retain wiper member 47 in wiper slot 46. Accordingly, it is to be understood that the invention is not to be limited by the specific illustrative embodiment, but only by the scope of the appended claims.

I claim:

1. In a variable resistance device of the type including a housing enclosing a cavity in which an annular resistance element is supported on a nonconductive base member, a rotor member positioned within said housing and having top and bottom surfaces, an electrically conductive wiper member secured to said rotor member for rotation therewith and extending into electrically conductive engagement with said resistance element, and drive means for rotating said rotor member, the improvement wherein said rotor member is formed from a resilient material and has a slot extending laterally therethrough and inwardly from said bottom surface thereof, wherein said wiper member is substantially flat and extends through said slot in said rotor member, wherein said base member contacts said bottom surface of said rotor member, and comprising means positioned within said cavity in said housing and contacting said top surface of said rotor member for exerting an axial force thereon to assure engagement between said bottom surface of said rotor member and said base member, said axial force causing compression and deformation of said rotor member thereby closing said slot around said wiper member to firmly retain said wiper member therein.

2. In a variable resistance device according to claim 1, the improvement wherein said rotor member has a substantially planar bottom surface having formed therein an annular recessed area into which said annular resistance element extends and a central recessed area, defining a pressure ring therebetween, said pressure ring cooperating with said force exerting means to cause said compression of said rotor member.

3. In a variable resistance device according to claim 1, the improvement wherein said rotor member is formed from a resilient fluorocarbon material.

4. In a variable resistance device according to claim 3, the improvement wherein said fluorocarbon material is polytetrafluoroethylene.

5. In a variable resistance device according to claim 3, the improvmeent wherein said fluorocarbon material is monochlorotrifluoroethylene.

6. In a variable resistance device according to claim 1, the improvmeent wherein said rotor member has an axial bore extending thereinto from said top surface thereof and wherein said force exerting means comprises a bearing post projecting into said rotor member bore and having a beveled surface at the base thereof, said beveled surface contacting the wall of said rotor member bore causing said wall of said rotor member bore to deform thereat to substantially conform to the angle thereof.

7. In a variable resistance device according to claim 6 wherein said rotor member has a cylindrical side surface and wherein said drive means comprises a worm screw journalled through a side wall of said housing, the improvement wherein said rotor member has a plurality of gear teeth formed in the periphery thereof, said gear teeth being positioned at the intersection between said side surface and said top surface at an acute angle relative to the axis of rotation of said rotor member, said gear teeth engaging said worm screw and being driven thereby, said engagement between said bottom surface of said rotor member and said base member assuring engagement between said gear teeth and said worm screw.

8. In a variable resistance device according to claim 7, the improvement wherein said top surface of said rotor member has an arcuate groove formed therein, said groove partially absorbing said deformation of said rotor member, said groove further permitting lateral displacement of said gear teeth.

9. In a variable resistance device according to claim 1, the improvement wherein said rotor member has a hole extending laterally therethrough, at the end of said slot, and wherein one end of said wiper member includes a flange adapted to extend through said hole in said rotor member.

* * * * *